United States Patent [19]

Kalbach

[11] Patent Number: 5,020,708
[45] Date of Patent: Jun. 4, 1991

[54] OUTBOARD MOTOR STAND APPARATUS

[76] Inventor: Albert L. Kalbach, 4323 Santa Fe, Riverbank, Calif. 95367

[21] Appl. No.: 585,753

[22] Filed: Sep. 20, 1990

[51] Int. Cl.$^5$ .............................................. B60R 9/00
[52] U.S. Cl. ........................... 224/42.32; 224/42.45 R; 414/462; 414/465
[58] Field of Search ................... 224/42.45 R, 42.44, 224/42.08, 42.32, 42.21; 414/462, 465, 463

[56] References Cited

U.S. PATENT DOCUMENTS

| | | | |
|---|---|---|---|
| 2,429,551 | 10/1947 | Hitzemann . | |
| 2,663,474 | 12/1953 | Kelly | 414/462 |
| 3,039,634 | 6/1962 | Hobson et al. | 414/462 |
| 3,229,838 | 1/1966 | Johnson | 414/462 |
| 3,717,271 | 2/1973 | Bargman, Jr. | 414/463 |
| 4,278,191 | 7/1981 | Mecham | 224/42.21 |
| 4,381,069 | 4/1983 | Kreck . | |
| 4,391,379 | 7/1983 | Paffrath | 414/462 |
| 4,400,129 | 8/1983 | Eisenberg et al. | 224/42.44 |
| 4,406,574 | 9/1983 | Riley | 414/462 |
| 4,465,423 | 8/1984 | Anderson | 414/462 |
| 4,564,167 | 1/1986 | Smith . | |
| 4,625,900 | 12/1986 | Lawson . | |
| 4,705,179 | 11/1987 | Lathrum | 414/462 |
| 4,808,056 | 2/1989 | Oshima | 414/462 |

*Primary Examiner*—Linda J. Sholl
*Attorney, Agent, or Firm*—Henderson & Sturm

[57] ABSTRACT

An outboard motor stand apparatus (10) for use in a vehicle (100) wherein the apparatus (10) includes a mounting unit (11) secured to the interior of a vehicle (100), a main support unit (12) rotatably connected to the mounting unit (11) and an auxiliary support unit (13) pivotally secured to the main support unit (12). The auxiliary support unit (13) is further provided with a hinged mounting block member (35) adapted to be engaged by the engine mount (201) of an outboard motor (200).

8 Claims, 1 Drawing Sheet

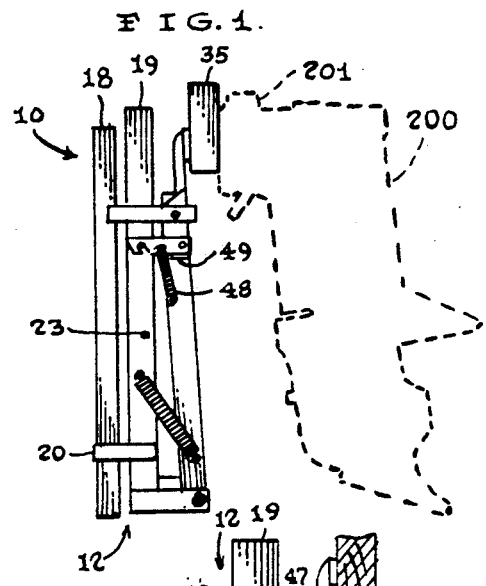
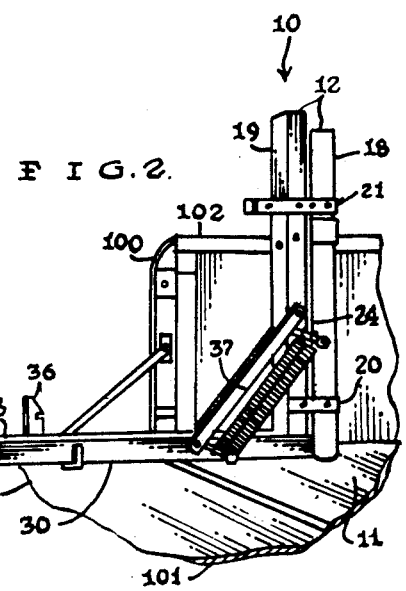
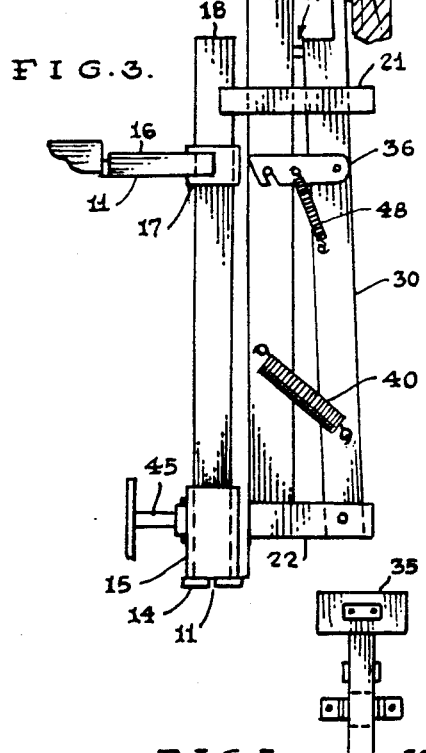
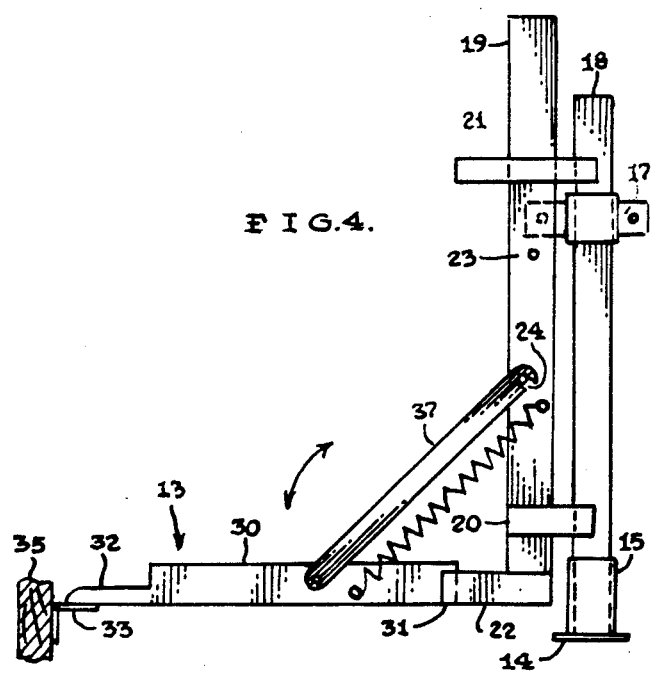
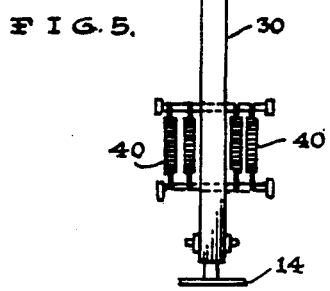

OUTBOARD MOTOR STAND APPARATUS

TECHNICAL FIELD

The present invention relates to the field of support stands for outboard motors and the like, and in particular to an outboard motor stand that is articulated and movable in more than one plane.

BACKGROUND ART

This invention was the subject matter of Document Disclosure Program Registration No. 243,574 which was filed in the United States Patent and Trademark Office on Jan. 18, 1990.

As can be seen by reference to the following U.S. Pat. Nos. 2,429,551; 4,381,069; 4,564,167; and 4,625,900; the prior art is replete with myriad and diverse outboard motor stands of both the movable and stationary variety.

While all of the aforementioned prior art constructions are more than adequate for the basic purpose and function for which they have been specifically designed, these patented structures are uniformly deficient with respect to the degree of flexibility and range of motion that they afford to the user in the mounting and dismounting of the outboard motor relative to the support device.

Furthermore, virtually all of the movable prior art constructions make no provision whatsoever to minimize the effective weight of the outboard motor during the unloading and loading stages, and rely instead on the user to manhandle the motor off of, and onto, the support device.

As a consequence of the foregoing situation, there has existed a longstanding need for an articulated, pivotable, outboard motor stand apparatus that offers a degree of flexibility and maneuverability unavailable in prior art constructions, plus incorporating relatively heavy spring biasing to offset the weight of the outboard motor, and the provision of such a construction is a stated objective of the present invention.

DISCLOSURE OF THE INVENTION

Briefly stated, the outboard motor stand apparatus that forms the basis of the present invention comprises a vehicle mounted support unit, a main support unit which is rotatably disposed relative to the vehicle mounted support unit, and a motor associated support unit which is pivotally disposed relative to the main support unit.

In addition, the apparatus also includes a plurality of spring members and latch members operatively associated with both the motor associated support unit and the main support unit. The spring members are provided to offset the weight of the motor as the motor is being raised and lowered on the motor associated support unit, and the latch members are employed to selectively immobilize the motor associated support unit in either its vertical or horizontal disposition. Furthermore, when the motor associated support unit is deployed in the horizontal disposition, the horizontal latch member will also serve as an auxiliary support arm which will limit the pivoted movement of the motor associated support unit relative to the main support unit.

As will be explained in greater detail further on in the specification, the outboard motor stand apparatus of this invention is intended to be used in the back of the trucks or vans. The outboard motor is maintained in an upright position along one side of the vehicle interior while not in use, and when the motor is needed, the apparatus allows the motor to be rotated towards the rear of the vehicle and pivoted outwardly and downwardly such that the motor is suspended beyond the tailgate of the vehicle so that the motor can be easily transferred to, or from, the transom of a boat.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a side perspective view of the apparatus disposed within a vehicle with the motor deployed in the storage mode;

FIG. 2 is a side perspective view of the apparatus deployed to suspend the motor outside of the vehicle;

FIG. 3 is an isolated right side elevation of the apparatus in the retracted mode;

FIG. 4 is an isolated left side elevation of the apparatus in the extended mode; and FIG. 5 is an isolated front elevation of the apparatus in the retracted mode.

BEST MODE FOR CARRYING OUT THE INVENTION

As can be seen by reference to the drawings, and in particular to FIG. 2, the outboard motor stand apparatus that forms the basis of the present invention is designated generally by the reference numeral (10). The apparatus (10) comprises in general, a vehicle attached mounting unit (11), a main support unit (12) and an auxiliary support unit (13). These units will now be described in seriatim fashion.

As shown in FIGS. 3 through 5, the vehicle attached mounting unit (11) comprises a base member (14) rigidly fastened to the floor (101) of a vehicle (100). The base member (14) is further provided with an upwardly projecting hollow cylindrical stub member (15). In addition, the support unit (11) further comprises a bracket arm member (16) secured on one end to the sidewall (102) of the vehicle (100). The other end of the bracket arm member (16) is provided with a hollow cylindrical collar member (17) and the collar member is axially aligned with the cylindrical stub member (15).

As can best be seen by reference to FIGS. 1 through 4, the main support unit (12) comprises a first elongated tubular support member (18) which is dimensioned to be rotatably received in the stub member (15) and the collar member (17) of the vehicle attached support unit (11).

In addition, the main support unit (12) further comprises a second elongated tubular support member (19) rigidly secured to the first tubular support member (18) via two pairs of spaced connector arms (20, 21). At least the upper pair of connector arms (21) project outwardly beyond the second tubular support member (18) for reasons that will be explained further on in the specification.

As shown in FIGS. 3 through 5, the second tubular support member (19) is also provided with a pair of elongated foot elements (22) which are aligned with the upper pair of connector arms (21) and which project outwardly from the lower end of the second tubular support member (19). In addition, the second tubular support member (19) is further provided with a pair of latching posts (23, 24) formed on opposite sides of the second tubular support member (18).

Turning now to FIGS. 1 through 4, it can be seen that the auxiliary support unit (13) comprises an elongated pivoted support arm (30) which is pivotally secured on its lower end (31) to the outboard ends of foot elements (22) on the second tubular support member (19). In addition, the upper end (32) of the pivoted support arm (30) is provided with a hinge member (33) which is operatively attached to an enlarged mounting block member (35) which is dimensioned to be engaged by the engine mount (201) on a conventional outboard motor (200).

Still referring to FIGS. 1 through 4, it can be seen that the pivoted support arm (30) is further provided with a pair of pivoted latch arms (36, 37). The first latch arm (36) is relatively short and is dimensioned to engage latching post (23) on the second tubular support member (19) for maintaining the pivoted support arm (30) in the retracted upright position depicted in FIGS. 1 and 3. The second latch arm (37) is relatively long and is dimensioned to engage latching post (24) on the second tubular support member (19) for maintaining the pivoted support arm (30) in the horizontally disposed extended position depicted in FIGS. 2 and 4. In addition, the first latch arm (36) is spring biased downwardly relative to the latching post (23) to ensure that the pivoted support arm (30) will be maintained in the upright retracted position when so desired.

As shown in FIGS. 3 and 5, a plurality of heavy duty spring members (40) are operatively connected between the pivoted support arm (30) and the second tubular support member (19). The heavy duty spring members (40) will offset the weight of the outboard motor (200) as the motor (200) is being raised and lowered on the pivoted support arm (30).

As can be seen particularly by reference to FIG. 3, the hollow cylindrical stub member (15) is provided with a threaded aperture dimensioned to receive a threaded locking member (45) which can selectively immobilize the first tubular support member (18) relative to the stub member (15) such that the main support unit (12) can be rotated and then locked into its storage position relative to the interior of the vehicle (100).

Furthermore, a resilient bumper member (47) is disposed intermediate the upper ends of both the front of the second tubular support member (19) and the back of the rigid support arm (30) to cushion the contact between these members. In addition, the support arm (30) is further provided with a horizontally disposed ledge element (49) which is positioned beneath the first latch arm (36) such that the spring biasing element (48) cannot pivot the first latch element below the horizontal plane.

Turning now to FIGS. 3 through 5, it can be appreciated that the upper pair of connector arms (21) which project outwardly from the second tubular support member (19) are dimensioned to receive and frictionally engage the sides of the rigid pivoted support arm (30) when the support arm (30) is disposed in the upright retracted position depicted in FIGS. 3 and 5.

By now it should be appreciated that the apparatus (10) heretofore described allows the user to store an outboard motor (200) in an upright position within the interior of a vehicle such as a van or pickup truck. Then when the motor (200) is needed, all that is required is for the threaded locking member (45) to be disengaged to free the main support unit (12) relative to the stub (15) so that the main support unit (12) can be rotated towards the tailgate (103) of the vehicle (100).

At this point, the first latch arm (36) is disengaged from latching post (23) to disengage the auxiliary support unit (13) from the main support unit (12). The rigid support arm (30) is pivoted downwardly so that the mounting block member (35) bearing the outboard motor (200) will project beyond the end of the tailgate (103) of the vehicle (100).

It should further be noted that not only does the second latch arm (37) and latching post (24) prevent the rigid support arm (30) from travelling past the horizontal position when the motor (200) is deployed on the mounting block member (35), but the second latch arm (37) and the latching post (24) also act to maintain the rigid support arm (30) in the horizontal position against the influence of the heavy duty spring members (40) once the motor (200) is removed from the mounting block member (35).

It should also be noted that the hinge member (33) on the upper end of the rigid support arm (30) always maintains the mounting block member (35) in a vertical orientation such that the outboard motor (200) is likewise maintained in an upright position during the pivoted travel of the rigid support arm (30), so that oil and gas will not be able to escape from the outboard motor (200) when the motor (200) is operatively engaged with the apparatus (10).

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

I claim:

1. An outboard motor stand apparatus for use in the interior of a vehicle wherein the apparatus comprises:
    a mounting unit operatively secured to the interior of the vehicle; and, including a base member fastened to the floor of the vehicle and further provided with a hollow cylindrical stub member;
    a main support unit rotatably disposed relative to said mounting unit and having an upper end and a lower end; wherein the main support unit comprises: a first elongated vertical support member which is rotatably disposed in said stub member; and, a second elongated vertical support member spaced from and secured to said first elongated support member; and
    an auxiliary support unit pivotally secured on one end to the lower end of said mounting unit; wherein, the other end of said auxiliary support unit has means for receiving the conventional engine mount on said outboard motor to maintain the outboard motor in a vertically upright disposition during the unloading and storage modes of disposition of the outboard motor relative to the interior of said vehicle.

2. The apparatus as in claim 1 wherein said auxiliary support unit is pivotally connected to the lower end of said second elongated vertical support member.

3. The apparatus as in claim 2 wherein the auxiliary support unit comprises a rigid support arm having one end pivotally secured to the lower end of said second vertical support member and having a hinge element disposed on the other end.

4. The apparatus as in claim 3 wherein said means for receiving the conventional engine mount comprises a mounting block member.

5. The apparatus as in claim 4 wherein the mounting block member is operatively connected to said hinge element.

6. The apparatus as in claim 1 wherein a pair of heavy duty springs are operatively connected between said main support unit and said auxiliary support unit.

7. The apparatus as in claim 1 further comprising first latching means provided between said main support unit and said auxiliary support unit for maintaining said auxiliary support unit in a vertical orientation relative to said main support unit.

8. The apparatus as in claim 7 also comprising second latching means provided between said main support unit and said auxiliary support unit for maintaining said auxiliary support unit in a horizontal orientation relative to said main support unit.

* * * * *